(12) United States Patent
Chu

(10) Patent No.: US 7,174,488 B1
(45) Date of Patent: Feb. 6, 2007

(54) ECHO CANCELER-BASED MECHANISM FOR PERFORMING AND REPORTING FAULT DIAGNOSTIC TESTING OF REPEATERED TELECOMMUNICATION LINE

(75) Inventor: Fred T. Chu, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 575 days.

(21) Appl. No.: 10/424,304

(22) Filed: Apr. 28, 2003

Related U.S. Application Data

(63) Continuation-in-part of application No. 10/403,321, filed on Mar. 31, 2003, now Pat. No. 7,023,963, which is a continuation-in-part of application No. 10/246,368, filed on Sep. 18, 2002, now abandoned.

(51) Int. Cl.
*G01R 31/28* (2006.01)
(52) U.S. Cl. ..................................... 714/712
(58) Field of Classification Search ................ 714/712, 714/713, 714, 716
See application file for complete search history.

(56) References Cited

U.S. PATENT DOCUMENTS

| | | | | |
|---|---|---|---|---|
| 4,243,959 A | | 1/1981 | Duttweiler | ............ 333/166 |
| 4,270,029 A | * | 5/1981 | Sato et al. | ............ 375/214 |
| 4,301,538 A | * | 11/1981 | Desombre et al. | ......... 375/214 |
| 4,756,005 A | * | 7/1988 | Shedd | ............ 375/213 |
| 5,084,865 A | | 1/1992 | Koike | ............ 370/32.1 |
| 5,111,497 A | * | 5/1992 | Bliven et al. | ............ 379/27.01 |
| 5,244,067 A | | 9/1993 | Skotek et al. | ............ 192/125 |
| 5,761,938 A | | 6/1998 | College | ............ 72/5 |
| 5,774,316 A | | 6/1998 | McGary et al. | ............ 361/42 |
| 6,011,399 A | | 1/2000 | Matsumaru et al. | ........ 324/538 |
| 6,480,532 B1 | | 11/2002 | Vareljian | ............ 375/222 |
| 6,807,370 B2 | * | 10/2004 | Harasawa | ............ 398/13 |
| 6,819,744 B1 | * | 11/2004 | Banwell et al. | ............ 379/1.01 |
| 2003/0063711 A1 | | 4/2003 | Ginesi et al. | ............ 379/1.01 |

\* cited by examiner

*Primary Examiner*—James C Kerveros
(74) *Attorney, Agent, or Firm*—Allen, Dyer, Doppelt, Milbrath & Gilchrist, P.A.

(57) ABSTRACT

A repeater-installed fault location mechanism conducts parametric measurements on a segment of wireline to which the repeater is connected, and adjusts taps of an echo cancellation operator in the repeater transceiver equipment, in accordance with the response of the wireline to an electrical stimulus imparted to the wireline segment. Information representative of the echo canceler tap coefficients is then transmitted over an overhead to a processor, to determine fault the location of a fault.

23 Claims, 11 Drawing Sheets

ECHO CANCELER-BASED MECHANISM FOR PERFORMING AND REPORTING FAULT DIAGNOSTIC TESTING OF REPEATERED TELECOMMUNICATION LINE

CROSS-REFERENCE TO RELATED APPLICATION

The present application is a continuation-in-part of U.S. patent application Ser. No. 10/403,321, filed Mar. 31, 2003, now U.S. Pat. No. 7,023,963, entitled: "DSL Line Card Echo Canceler-Based Mechanism for Locating Telecommunication Line Fault," which is a continuation-in-part of U.S. patent application Ser. No. 10/246,368, filed Sep. 18, 2002, now abandoned, entitled "DSL Line Card Echo Canceler-Based Mechanism for Locating Telecommunication Line Fault," each application being assigned to the assignee of the present application and disclosures of which are incorporated herein.

FIELD OF THE INVENTION

The present invention relates in general to communication systems, and is particularly directed to a digital echo canceler-based technique for conducting, and reporting via an overhead channel, parametric measurements on successive segments of a repeatered wireline, and determining from measured echo canceler tap data the location of a fault along a respective segment of the wireline.

BACKGROUND OF THE INVENTION

As described in the above-referenced co-pending applications, as DSL technology continues to expand, communication service providers are confronted with the problem that the cost of deployment and maintenance of a DSL circuit may exceed the cost of the DSL equipment shelf. A common maintenance issue involves resolving a service-impairing fault that has occurred somewhere along a DSL circuit. When responding to a DSL trouble call, one or multiple craftspersons or service technicians may be dispatched to one or more locations along the DSL circuit. For example, a fault occurring within the central office (CO) proper will be handled by a CO technician, while a facility technician will be assigned to resolve faults that occur along the cable plant between the central office and the customer site; further, an SSI&M technician has the responsibility of resolving a problem at the customer premises.

In order to avoid the unwanted expense and delay associated with sending different technicians to different portions of the DSL circuit, it is desirable that the location of the fault be identified prior to dispatching service personnel to correct the problem. Also, once a technician has arrived at a potential fault location along the wireline, it may be necessary for the technician to connect and operate expensive test equipment to pinpoint the exact location and type of fault. Although techniques exist for detecting various types of fault and estimating their location along the DSL link, schemes proposed to date are computationally intensive, require dedicated pieces of test equipment and are not readily suited for installation on currently deployed equipment, such as DSL line cards or repeaters.

Advantageously, the invention disclosed in the above referenced applications, to be described hereinbelow with reference to FIGS. 1–19, successfully addresses these shortcomings, by making use of the digital echo canceler that is resident in the transceiver of an industry standard DSL line card, to estimate changes in echo path, both upstream and downstream of an apparent line fault. Locating the peak of the return signal allows the echo channel information to be correlated directly to the location of the fault.

A reduced complexity diagram of a DSL line card transceiver employing a PAM/QAM based digital echo canceler used for this purpose is shown in FIG. 1. As shown therein, a line interface section 10 is installed between a telecommunication wireline pair 20, and respective transmitter and receiver units 30 and 40 of the line card. A digital echo canceler 50, such as a linear adaptive finite impulse response (FIR) filter, is coupled between output 31 of the transmitter unit 30 and a first input 61 of a differential accumulator 60, having a second input 62 coupled to a received signal output 14 of the line interface section 10.

Within the line interface section 10, a transmit input 11, to which the output of the digital data signal from the transmit unit 30 is applied, is coupled to a digital transmit filter 70. The filtered digital signal is converted into analog format in digital-to-analog converter (DAC) 72, and the analog transmit signal is then filtered by an analog transmit filter 73 for application to the telecommunication line 20 via a hybrid network 74 and a line-coupling transformer 75. In the receive direction (from the line 20 to the receiver unit 40), a received analog signal at the line input port 13 is coupled through transformer 75 and hybrid circuit 74, and applied to an analog receive filter 76. The filtered analog signal is then digitized in analog-to-digital converter (ADC) 77 and coupled through a digital receive filter 78 to the received signal output 14.

With the digital echo canceler 50 implemented as a linear adaptive FIR filter, a least mean squared (LMS) algorithm is employed to attempt to minimize the error (err) output 63 of the differential accumulator 60. When the echo path is linear and the number of echo canceler taps exceeds the duration of the impulse response of the echo path, the echo path function Hec(f) can be approximated with the echo canceler Hd(f) with a minimal amount of error.

FIG. 2 shows a reduced complexity, 'mathematical model' that represents the echo canceler problem of the signal transport path of FIG. 1, as a correlation cancellation problem, in which an echo path block 100 corresponds to the line interface 10 of FIG. 1. Ideally, the echo path Hd(f) is approximately equal to the echo path function Hecg(f), with the accumulated error (err) approaching zero, when the LMS algorithm of the echo canceler converges. This means that the impulse response of the overall echo path may be readily estimated.

FIG. 3 is a block diagram approximation of the overall echo path response Hecg(f), that enables the contribution of the line 20 to be estimated. As shown therein, the transmit filters of FIG. 1 are shown as a Transmit Filter function Htx(f) 310, the output of which is coupled to each of a hybrid function Hhybrid (f) 320 and a Line Response function Hline (f) 330. The outputs of these latter two functions are differentially combined at 340, with the differential result being coupled to a Receive Filter function Hrx(f) 350. The block diagram of FIG. 3 is an approximation of the overall echo path echo response, since Hhybrid(f) is also a function of Hline(f). As a result, what is produced is an approximation of the loop response, which can be defined in equation (1) as follows.

$$H\text{line}(f) = Hec(f)/[Htx(f)*Hrx(f)] - H\text{hybrid}(f)\ Hd(f)/[Htx(f)*Hrx(f)] - H\text{hybrid}(f) \quad (1)$$

Equation (1) implies that an estimate of the channel response may be derived from the echo canceler with knowledge of Htx(f), Hrx(f) and Hhybrid(f). It is relatively easy to generate an accurate model of the transmit filter response Htx(f) and the received filter response Hrx(f). However, it is difficult to initially define Hhybrid(f), due to the fact that a given analog circuit cannot be precisely replicated in terms of components and board layout. With two unknowns (Hhybrid(f) and Hline(f)) and only one equation, this would render the channel estimation method of little use, without being able to separately measure or estimate Hybrid(f).

One way to measure Hhybrid(f) is to set the loop transfer function Hline(f) to zero, i.e. to open tip and ring. This simplifies equation (1) to equation (2) as:

$$Hhybrid(f) = Hd0(f)/[Htx(f)*Hrx(f)] \qquad (2)$$

Hd0(f) is the echo canceler response as measured when the tip and ring are open. Substituting equation (2) into equation (1) produces equation (3) as:

$$Hline(f) \approx [Hd(f) - Hd0(f)]/[Htx(f)*Hrx(f)] \qquad (3)$$

Equation (3) reveals that Hhybrid(f) can be estimated by opening the path between the wireline and the transceiver.

For this purpose, FIG. 4 diagrammatically shows the insertion of a relay 410 between the wireline (the loop under test(LUT)) 420 serving the remote transceiver 450, and the transmit output 401 of a DSL transmitter 400 and the receive input 431 of a DSL receiver unit 430 within a DSL line card 440. The transceiver is coupled through a test head 460 to a test center processor 470.

The relay 410 is closed to estimate the echo canceler response when the transceiver 440 is connected to the loop. The line impulse response is estimated by performing an inverse fast Fourier transform ($FFT^{-1}$) of the frequency response estimate, in accordance with equation (4) as:

$$hline(t) \approx FFT^{-1}\{[Hd(f)-Hd0(f)]/[Htx(f)*Hrx(f)]\} \qquad (4)$$

If the loop contains a fault, the loop impulse response hline(t) will contain a peak at the location of the fault. The distance to the fault is calculated by measuring the round trip propagation delay of the return signal (echo). As a non-limiting example, for an HDSL2 system sampling at 1.034 Mbaud, each tap delay is approximately equal to one microsecond. With the speed of light being $3 \times 10^8$ m/s and a 0.6 factor for electron propagation within copper, the delay of one tap corresponds approximately to 500 ft round-trip distance. This implies that if there is a return signal peak at the tap #10 of the hline(t) estimate, then the wireline distance from the transceiver to the fault is approximately 10*250=2.5 kft. If the fault is an open circuit, the estimate will exhibit a positive peak, whereas a short circuit will produce a negative peak. The type of fault also may be determined by measuring DC loop current.

FIG. 5 is a flow chart of a routine performed by the control processor within the line card that causes the transceiver to transmit a wideband signal downstream toward a cable fault, and allows the taps of an echo-canceler (such as tapped delay line using least means squared (LMS) adaptation) to converge on the signal reflected back upstream from the fault. The shape of the echo-canceler taps are then analyzed to determine the type and location of the fault. As pointed out above, because the components of the analog front end of the DSL transceiver unit can be expected to vary slightly from circuit to circuit, the DSL's front end will, in turn, have a varying effect on the reflection of the transmitted signal. In order to establish the filter shape of a 'baseline' echo-cancellation characteristic, the wideband signal is initially transmitted from the line card transceiver into an open circuit (contacts of relay 410 open).

For this purpose, at shown at step 501, the contacts of the relay 410 between the line card's DSL transceiver units and the wireline 20 are initially opened, and a first set (#1) of echo-canceler taps are stored. Next, in step 502, a self-test of the transceiver is executed. In query step 503 a determination is made as to whether the transceiver has passed the self test. If so (the answer to query step 503 is YES), the routine transitions to step 504. However, if the self test fails (the answer to query step 503 is NO), the routine transitions to step 505, which sends an error code to terminate the measurement operation, indicating there is a problem with the transceiver itself. (For purposes of the present example, it will be assumed that the transceiver is fully operational, so the answer to query step 503 is YES,)

Next, in step 504, the relay contacts 410 are closed, which allows the taps (a second set (#2) of taps) of the echo-canceler to train up on the basis of the characteristics of the wireline to the fault. Once the second set of taps has trained up in step 504, then in step 506, both the original set (#1) and the second set (#2) are transmitted to a maintenance and testing center computer. Sending the tap coefficients to an external processor takes advantage of the considerably greater processing power that is available at facility separate from the line card, such as the central office maintenance and testing center. Alternatively, a more proximately located processor, such as that contained in a system control unit (SCU) installed in a common equipment rack or shelf with the line card, and communicating with the line card via the shelf backplane, may be used to perform fault location processing. This allows fault location data to be read directly from the line card equipment shelf to an associated computer terminal.

In order to improve the accuracy of the fault isolation process at the off card site (central office maintenance and testing center processor), the two sets of echo canceler taps are differentially combined in step 507. Next, in step 508, the frequency response of the remaining echo canceler taps are divided by the frequency response associated with the first set of taps (#1) to provide a 'normalized' response. Next, in step 509, the frequency response of the normalized echo canceler is converted to the time domain, to provide a time-domain amplitude response of the type shown in FIGS. 10, 11 and 12. This time domain response is then analyzed in step 510 to locate the peak, and thereby determine the location and type of fault. In step 511, fault location information is supplied to the dispatch service center, which then identifies the appropriate servicing technician to be sent the location of the fault along the DSL cable plant.

While the use of a relay as described above facilitates determining the filter shape of a 'baseline' echo-cancellation characteristic, there are times when installing a relay on the line card may be costly or not physically possible, e.g., for line cards that are already in the field. In this circumstance fault location may be estimated using the reference echo return routine shown in the flow chart of FIG. 6.

As shown therein, at an initial training step 601, with the line card running normally, the echo canceler taps Hgd(f) of the "good" loop inside the transceiver are stored. When a fault occurs on the loop, e.g., due to human error (such as an accidental cable cut) or natural disaster (e.g., lightning strike), an alarm will be transmitted back to the test center.

In response to this alarm, in step 602, the line card initiates a rigorous self-test and, in step 603, transmits a self test response back to the test center. For purposes of the present example, it will be assumed that the line card has passed the self test (the fault problem is external, as described above), causing a 'pass' message to be returned to the test center in step 603. The test center operator can initiate a diagnosis command to the transceiver line card, or the transceiver line card itself can initiate a diagnosis command as soon as it detects a link outage.

In response to a diagnosis command, in step 604, the echo canceler retrains at a new line condition. As a result of the retrain operation, there will be two sets of echo canceler taps stored in the HDSLx-C transceiver shown in equations (5) and (6).

$$Hgline(f) \approx Hgd(f)/[Htx(f)*Hrx(f)] - Hhybrid(f) \quad (5)$$

$$Hbline(f) \approx Hbd(f)/[Htx(f)*Hrx(f)] - Hhybrid(f) \quad (6)$$

Here Hbline(f) is the line frequency response when the wireline contains a fault, i.e. a "bad" line response. Hgd(f) and Hbd(f) are the echo canceler frequency response as measured when the line is in a normal state, and a fault condition, respectively.

Since the fault response is directly proportional to the difference between a "good" line and a "bad" line, the dependency of Hybrid(f) is estimated by subtracting equation (5) from equation (6), as shown in equation (7).

$$Hbline(f) - Hgline(f) = Hfault(f) = [Hbd(f) - Hgd(f)]/[Htx(f)*Hrx(f)] \quad (7)$$

An estimate of the fault impulse response hfault(f) is derived by taking the $FFT^{-1}$ of equation (7). Namely, $$hfault(f) = FFT^{-1}\{[Hbd(f) - Hgd(f)]/[Htx(f)*Hrx(f)]\} \quad (8)$$

Equation (8) is very similar to equation (4). What is being measured is the difference between the good line and the bad line, rather than the line response itself. From a practical standpoint, this differential method has proven to be more accurate than the zero reference method described previously.

The fault location algorithm is simplifed if the denominator of equation (8) is set equal to one. Such a simplification is equivalent to assuming that the contribution to the time response of the transmit filter and the receive filter is negligible. Equation (8) then becomes:

$$hfault(t) = k*hbd(t) - hgd(t) \quad (9)$$

where k is the gain ratio of the AGC (automatic gain contro) gain setting of the line in a fault diagnostic mode and the AGC gain setting of the line in healthy (good) condition. The simplified algorithm of equation (9) does not have spectral estimation error due to FFT calculations of the front-end filters. Further it has been shown in simulations that the simplified algorithm has a better fault detection accuracy in the bridged-tap loops that algorithms using the inverse FFT.

FIG. 7 is a block diagram of the integration of software routines resident in different platforms of a telecommunication system to implement a comprehensive testing strategy for solving the loop fault detection problem, and a time line for these software/firmware interactions is shown in the flow chart of FIG. 8. As shown at step 801 of FIG. 8, an initial alarm is generated for the line card, when a loop fault is detected by the line card's firmware 701. Following the alarm, at step 802, a fault diagnostic routine is initiated by (the host processor 702 within) the control center. Next, in step 803, the line card's firmware 701 initiates a self-test.

Upon completion of the self-test, the line card's firmware 701 collects and stores fault detection data in step 804. In step 805, using a messaging routine 703, such as (TL-1) simple network management protocol (SNMP) or FDL/Ethernet, the data collected by the line card is forwarded to the host processor. Alternatively, where the host processor is installed in the same equipment shelf as the line card, the data collected by the line card may be forwarded by the line card via the back plance; a separate messaging routine, as the use of an FDL orderwire, is not required. In step 806, using a fault location algorithm 704, the host computer processes the fault detection data to locate the fault and, it step 807, displays the fault type/location on a graphic user interface (GUI) within the central test center. Finally, having located the fault, a craftsperson is dispatched in step 808.

Simulation Results

FIG. 9 shows a pair of HDSL2 transceivers 910 and 920 connected by a wireline pair 930 that is subject to a loop fault under various conditions.

FIGS. 10 and 11 respectively show the amplitude vs. tap number/distance characteristics of the FIR filter for an open and a short conductor loop fault over a range of from 250 ft to 7.5 kft. In each of the FIR characteristics of FIGS. 10 and 11, the positive peak of the fault impulse response corresponds to the distance to the fault. As can be seen from the Figures, as distance increases, the amplitude eventually decreases to the point where the estimation noise (due to processing limitations and other imperfections) exceeds the peak generated by the fault. This means that the fault location is beyond detection range. From the plotted data, maximum detection range is on the order of 7.5 kft for an open conductor loop.

FIG. 12 shows the response for an open circuit fault at 1 kft with the reference loop length (the separation distance between the two transceivers of FIG. 9, when the loop is working properly) varying from 9 kft down to 4 kft. This reference length may be shortened or lengthened with very little impact on the fault location estimation. The only change is the relative size of the detected peak amplitude, as a result of the different sizes of the reference echo response.

FIG. 13 shows the amplitude vs. tap numbers/distance characteristics of the line for open circuit faults at distances between 250 ft. and 7 kft. using the simplified algorithm. It may be noted that there is an offset of 15 taps due to the characteristics of the transmit and receive filters. A false reading using the simplified algorithm occurs at short distances, such as shown by the negative peak for the 250 ft. detection. Such false readings may be detected by using DC measurement techniques.

When considering loop anomalies such as bridged-tap loops with faults, there are two possibilities: 1) the fault is located closer to the central office than the bridged tap, as diagrammatically illustrated in FIG. 14; and 2) the fault is beyond the bridged-tap location, as diagrammatically illustrated in FIG. 15. In case 1, there is no impact on the performance of the loop detection algorithm described above, since the loop response at the fault is identical to the one without the bridged-tap influence. As a consequence, the results described above can be applied directly to the first case.

However, where the fault is beyond the bridged tap, the return signal or the difference of the return signal is dominated by the bridged-tap. In this case, the fault detection routine described above will detect the bridged-tap location instead of the fault location, with no additional information to help the algorithm. If it is known a priori that the bridged-tap will always be outside of the center office, then the wireline can still be segmented with respect to fault location. However, the fault location and type estimate is not as useful as in a non-bridged-tap loop.

The response characteristic of FIG. 16 shows loop faults located beyond a bridged-tap denoted as loop faults at locations of the bridged-taps, but with sign inversion, so that the fault detection algorithm effectively becomes a bridged-tap detection algorithm. When the bridged-tap is located relatively close to the central office (e.g., 500 ft or less), it may be used for fault location purposes. For a relatively close bridged-tap, the difference can be measured; however, the location prediction is off by the distance from the bridged-tap to the central office. Namely a shorted loop located 3 kft away, as shown in FIG. 17, will detected as being located in a range of from 250 ft to 0 ft. As a result, with prior knowledge of the bridged-tap location, measurement data can be calibrated by applying a prescribed constant to the fault location estimation. Thus, when an unknown bridged-tap is present on the loop, the measurement data will be less accurate. In reality, most bridge taps on loops encountered in the field are in the vicinity of the remote terminal, so that they are less of a problem statistically.

FIG. 18 diagrammatically illustrates the case of an open fault in one of the conductors of the wireline pair of FIG. 9. This type of fault is relatively difficult to detect, because it manifests itself as a very large return signal, irrespective of the distance to the fault.

There is very little differentiation in capacitance distance, when this type of loop is coupled to an LCR meter and the loop capacitance is measured differentially. As can be seen from the response characteristic of FIG. 19, although the "signature" of an open single conductor fault can be recognized, it is very difficult to identify anything less than 2 kft of resolution. As a result, although the fault can be detected and perhaps generally segmented in terms of wireline distance, the exact location of the single conductor fault is not readily apparent using the technique described above. To circumvent this problem, the capacitance of the loop may be measured as referenced to ground per conductor. Such a "conductor-to-ground" measurement can handle this loop fault more effectively than the differential signal sensed by the echo canceler, described above.

In the course of conducting loop measurements and gathering echo cancellation tap data, as described above, foreign DC voltages and power line influences may couple various unwanted voltages into the data signaling path. In most cases, these low frequency disturbances will not affect normal data pump operation. However, they may introduce chronic error problems in the transceiver if the level of coupling becomes too large. To avoid this potential problem, coupling to the line is preferably implemented by means of a transformer and a D.C. blocking capacitor and other digital filters, shown in FIG. 1, described above, to filter out most of these unwanted signals. The residual DC and low frequency signals will be rejected by the DC tap of the echo canceler. By monitoring the value of the DC tap, a threshold can be derived to alert the operator of the presence of a suspicious foreign power on the loop. Typically a reference DC tap captured during normal operation (without any error) is used. As long as the D.C. tap ratio (DCR) is within this threshold (typically in the range of 2 to 5), the alarm will not be triggered. The DCR may be defined in equation (10) as:

$$DCR = Current\ DCTap / Initial\ DCTap \qquad (10)$$

From the foregoing, it can be seen that the line card transceiver-resident, echo cancellation-based technique described in the above-reference applications is readily able to directly correlate measured echo channel data to the location of a fault along a wireline connected to the central office in which the line card is installed. Because a good percentage of networks contain repeatered wireline connections, it is desirable to extend this technique to resolving faults along such repeatered segments of the wireline between the central office and remote (customer premises) equipment.

SUMMARY OF THE INVENTION

In accordance with the present invention, this objective is successfully realized by using the transceiver equipment of a respective repeater to perform the same operations as those performed by a central office resident line card, described above. Each repeater's transceiver is provisioned in the same manner as the DSL line card in the central office site, so that each repeater is capable of performing the above-described echo-cancellation based fault testing on that segment of wireline to which the repeater is connected (either to another repeater or to the remote site in the case of the last repeater). Communications between a fault diagnostic repeater and the central office are conducted over an overhead channel, such as an embedded FDL overhead channel.

When a fault is detected at the central office, for example, when a central office transceiver (HxTUC) detects a large number of UAS (unavailable seconds), the fault diagnostic routine is run from the central line card, as described, to determine whether the fault resides in the segment of the wireline between the central office transceiver and the upstream-most repeater installed in the line. If the fault resides in this first, relatively upstream segment of the wireline, the fault is reported to the supervisory processing computer.

If no fault is detected in the segment of the wireline between the central office and the first repeater, an overhead message is conveyed to the first repeater to determine whether a fault condition exists on the downstream segment of wireline to which the first queried repeater is connected. If no fault is detected, the message is propagated down the wireline, one intervening repeater at a time, until a fault condition is identified.

When a queried repeater identifies a fault on its associated wireline segment, it proceeds to conduct the echo cancellation-based fault diagnostic routine described above. Once the fault diagnostic routine performed by that repeater has been completed, the results of the fault diagnostic operation are forwarded back up the wireline via the overhead channel to the central office. The reported results are then processed either locally via a backplane-resident processor or by way of remote computer site.

DETAILED DESCRIPTION

Figure 1:
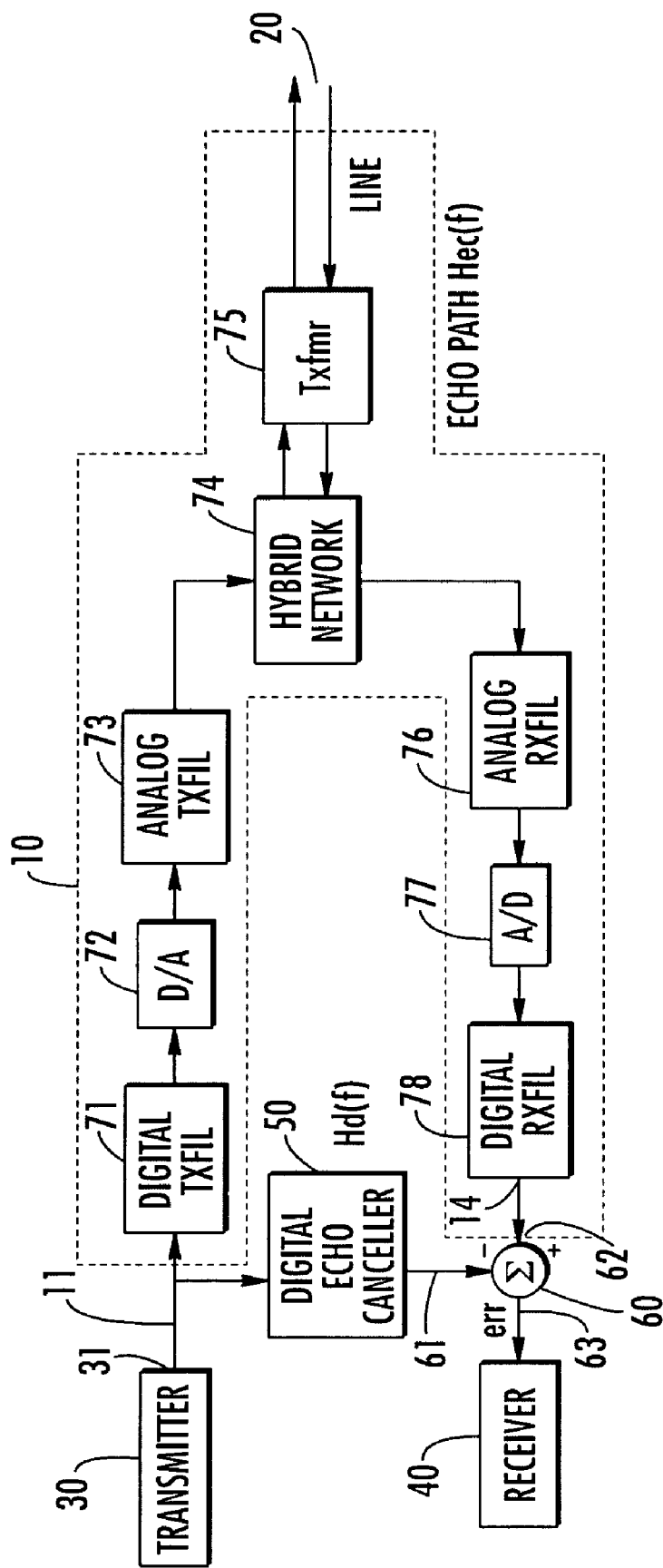
FIG. 1 diagrammatically illustrates a DSL transceiver having a PAM/QAM based digital echo canceler.
Figure 2:
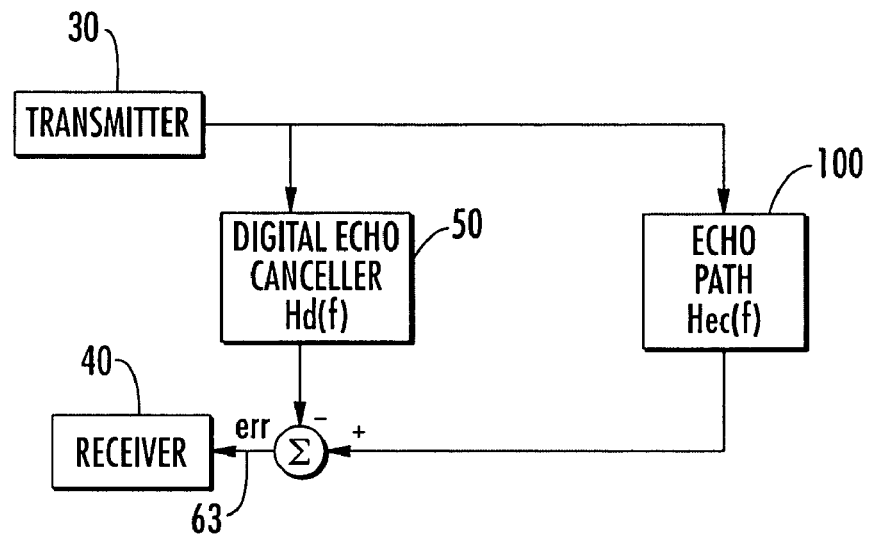
FIG. 2 shows a reduced complexity, correlation cancellation mathematical model of an echo canceler signal processing path of the signal transport path of FIG. 1.
Figure 3:
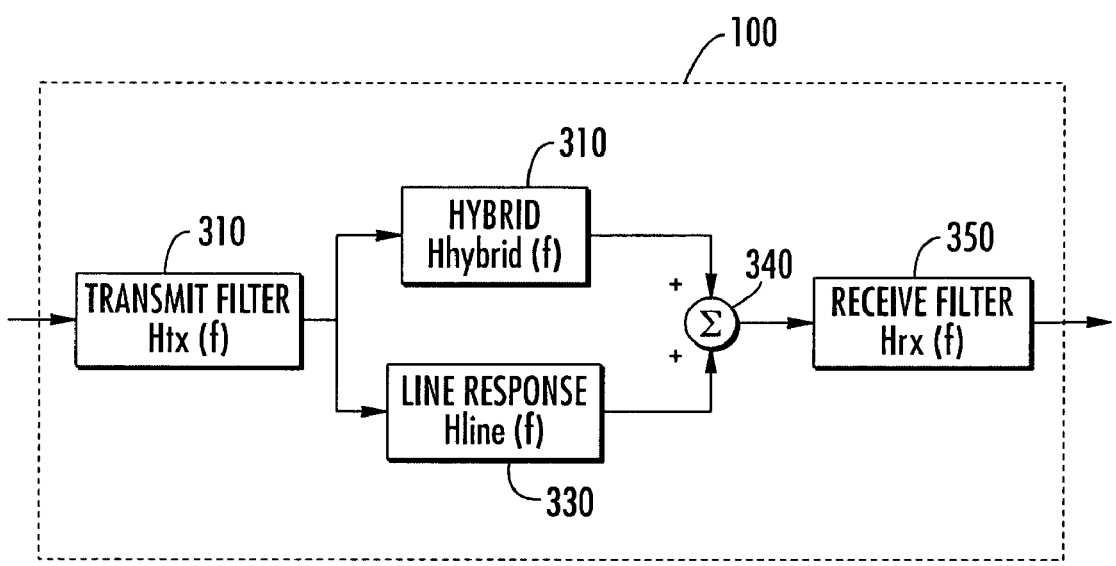
FIG. 3 is a block diagram approximation of the overall echo path response that enables the contribution of a wireline to be estimated.
Figure 4:
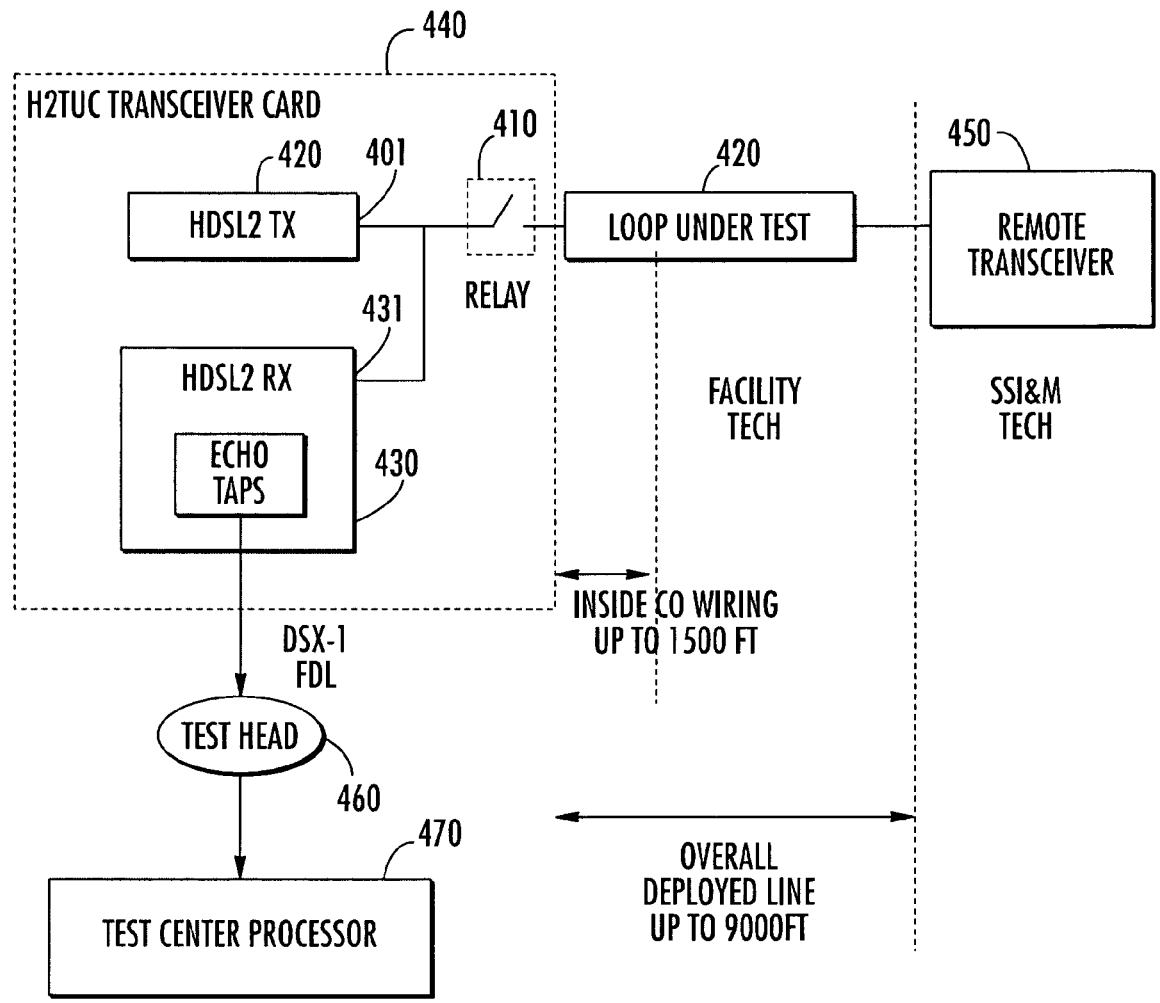
FIG. 4 diagrammatically shows the insertion of a relay between a wireline pair and a DSL line card transceiver.
Figure 5:
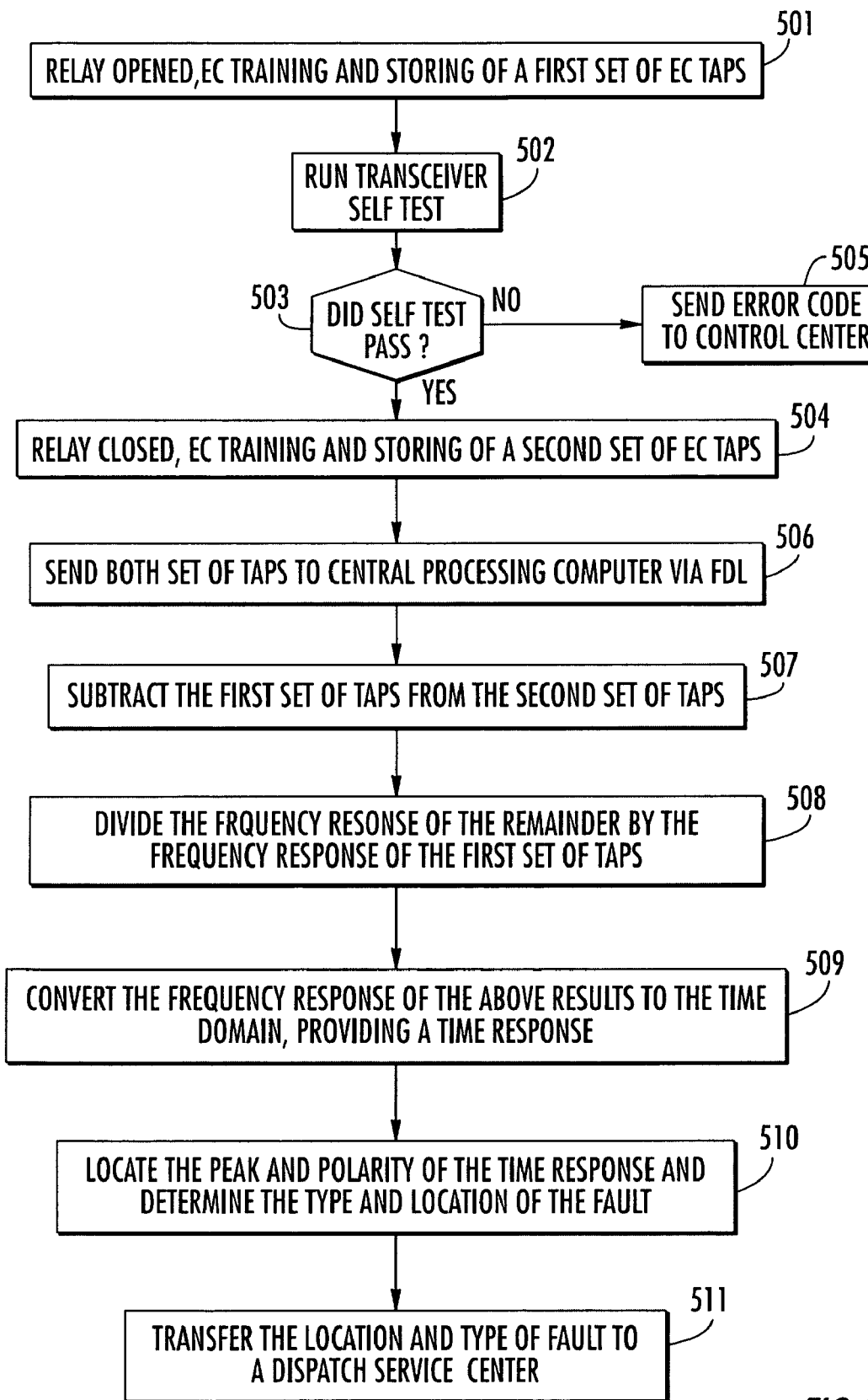
FIG. 5 is a flow chart showing steps of a zero reference-based echo canceler tap training routine in accordance with a first embodiment of the invention described in the above-referenced applications.
Figure 6:
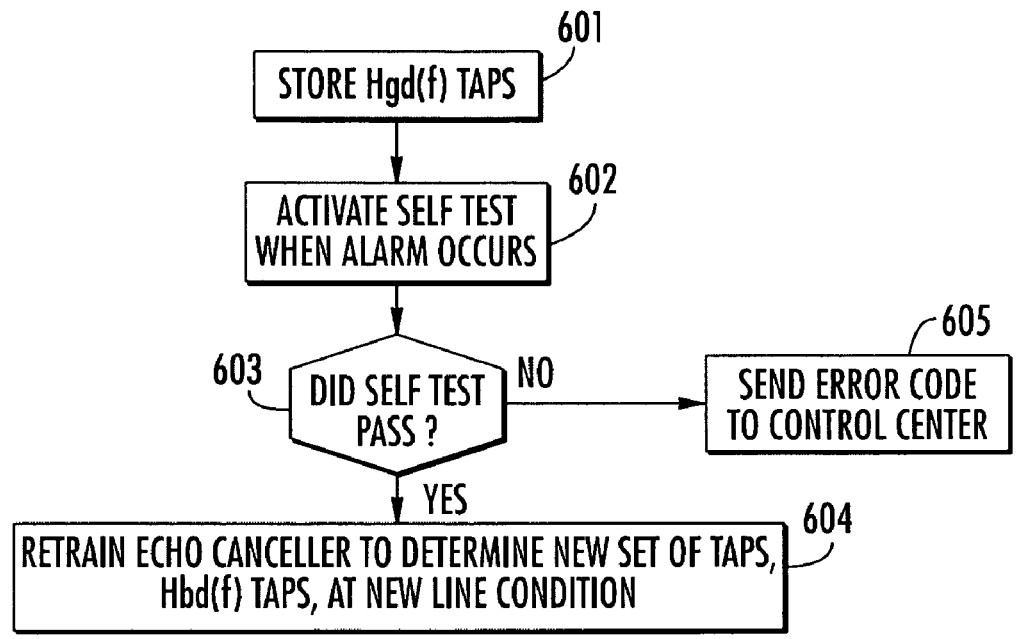
FIG. 6 is flow chart showing steps of a reference echo return-based echo canceler tap training routine in accordance with a second embodiment of the invention described in the above-referenced applications.
Figure 7:
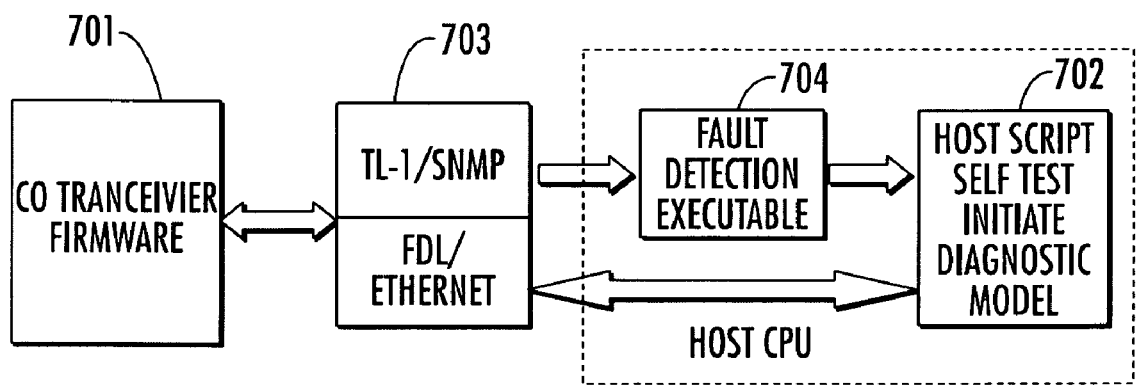
FIG. 7 is a block diagram of the integration of software routines resident in various platforms of a DSL telecommunication system.
Figure 8:
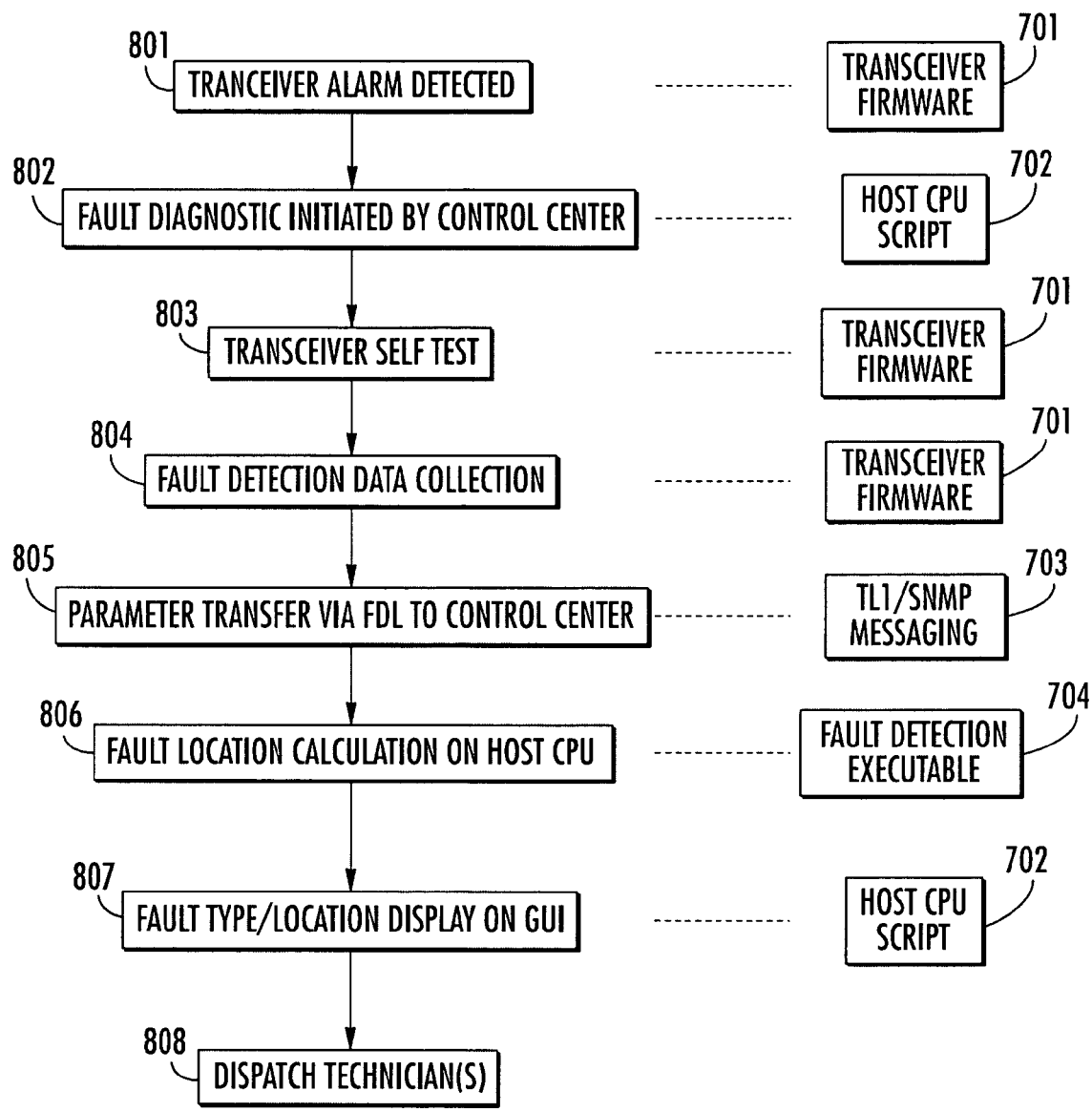
FIG. 8 is a time line flow chart associated with the integration block diagram of FIG. 7.
Figure 9:
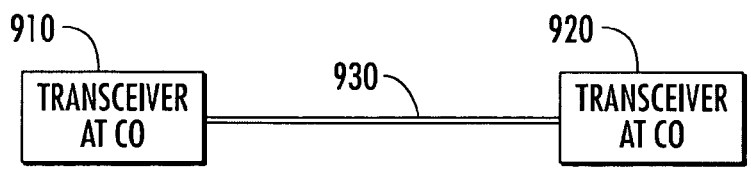
FIG. 9 shows a pair of DSL transceivers connected by a wireline pair subject to a loop fault.
Figure 10:
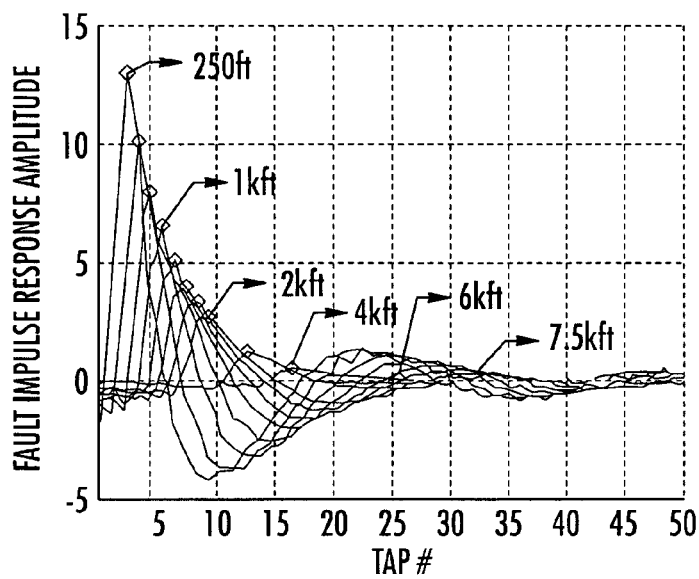
FIGS. 10 and 11 show respective amplitude vs. tap number/distance characteristics of an FIR filter for an open and a short conductor loop fault over a range of from 250 ft to 7.5 kft.
Figure 11:
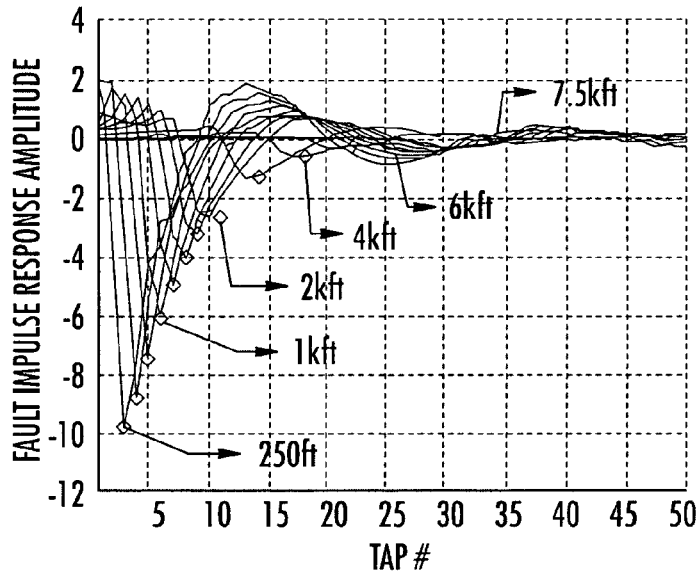
Figure 12:
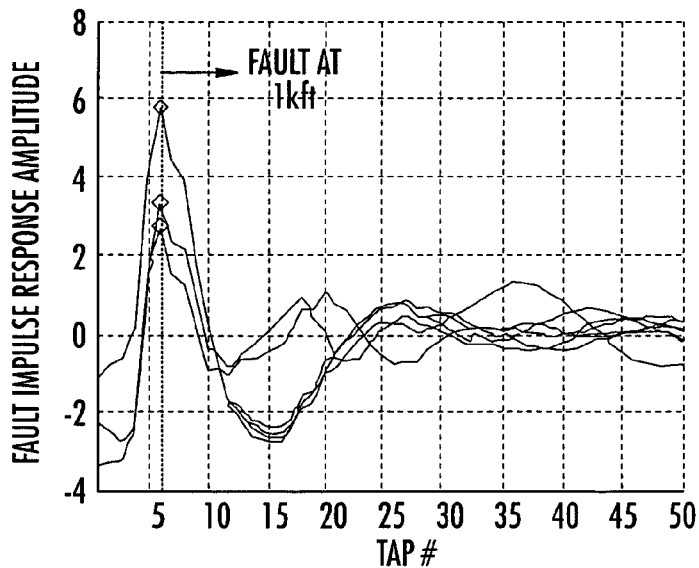
FIG. 12 shows the response for an open circuit fault at one kft with the reference loop length varying from 9 kft to 4 kft.
Figure 13:
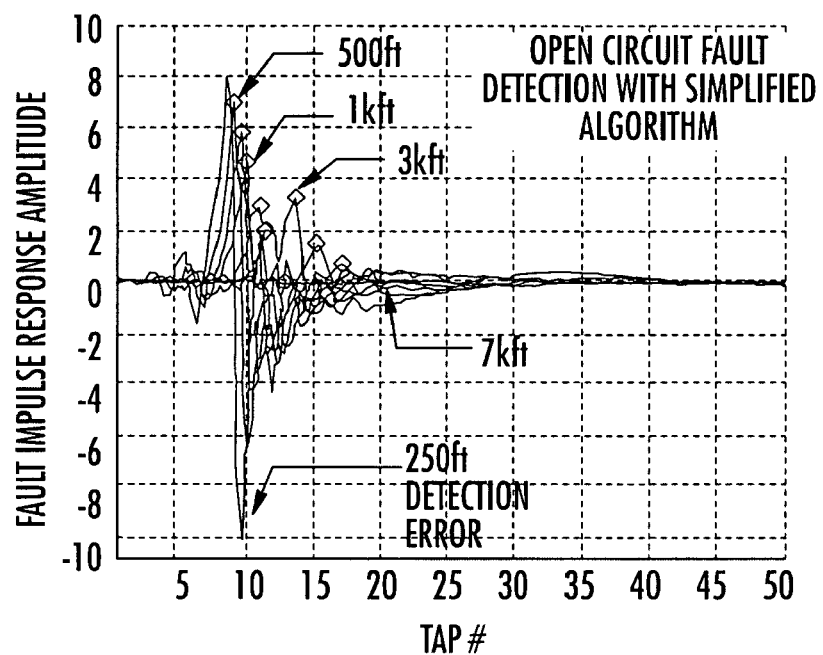
FIG. 13 shows amplitude vs. tap number/distance for an open circuit fault using a simplified algorithm.
Figure 14:
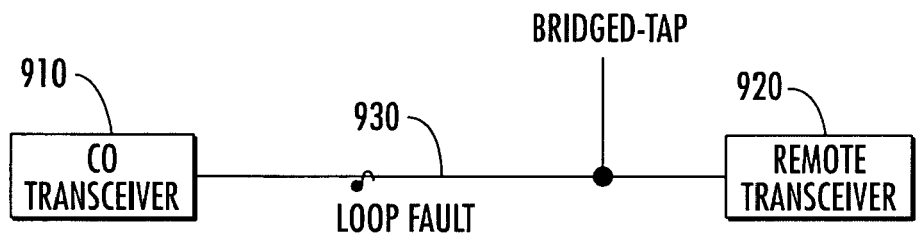
FIG. 14 shows a loop containing a fault located closer to the central office than a bridged tap.
Figure 15:
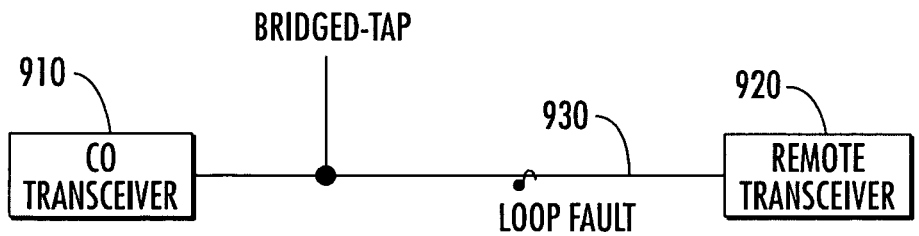
FIG. 15 shows a loop containing a fault located beyond a bridged-tap.
Figure 16:
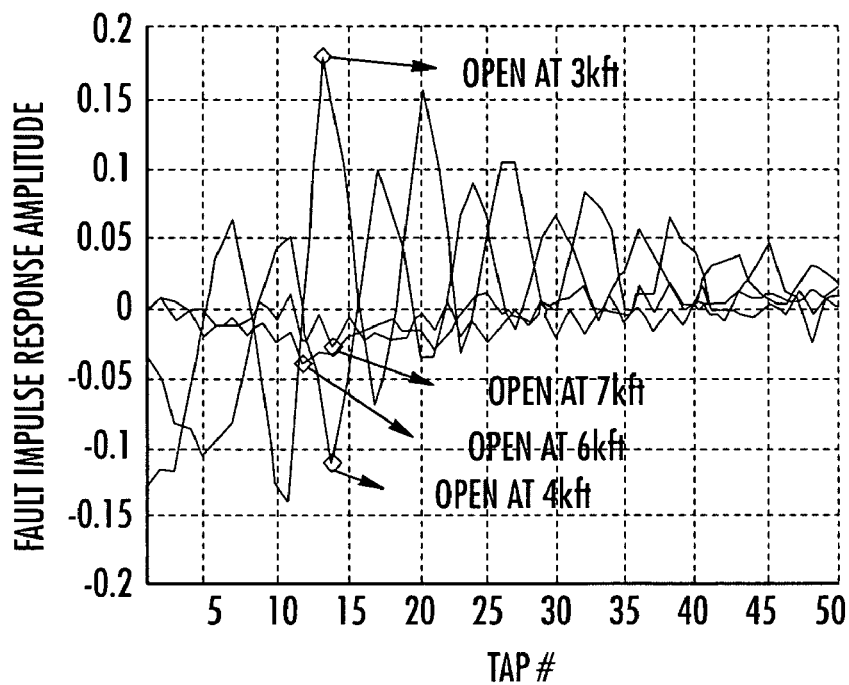
FIG. 16 is a loop response characteristic showing loop faults beyond a bridged-tap.
Figure 17:
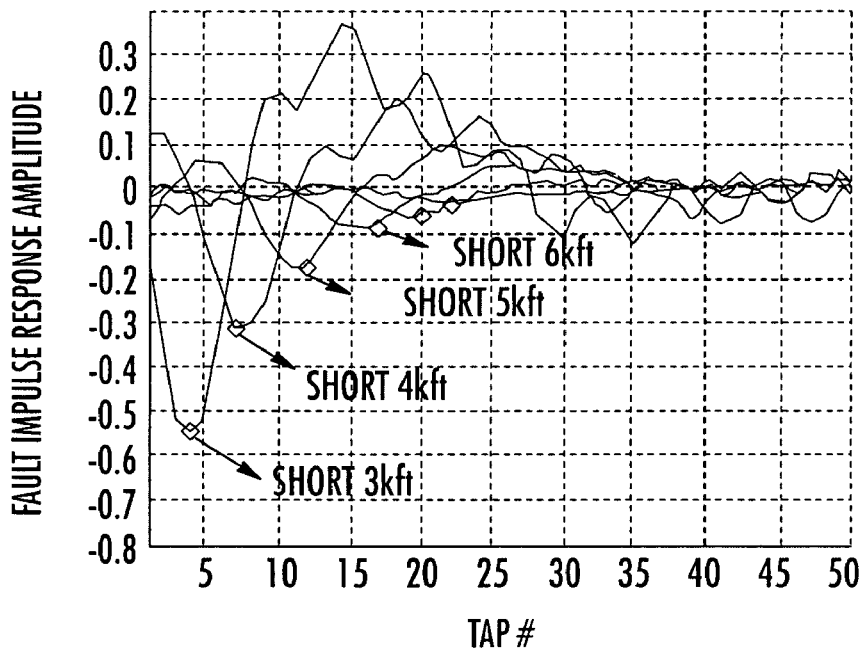
FIG. 17 shows a loop response characteristic with a 500 ft. bridged-tap 3000 ft. away from the central office.
Figure 18:
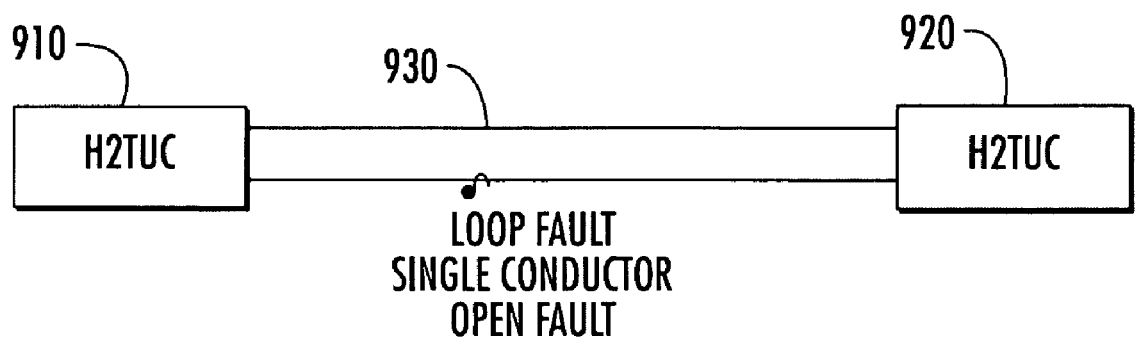
FIG. 18 diagrammatically illustrates an open fault in one of the conductors of the wireline pair of FIG. 9.
Figure 19:
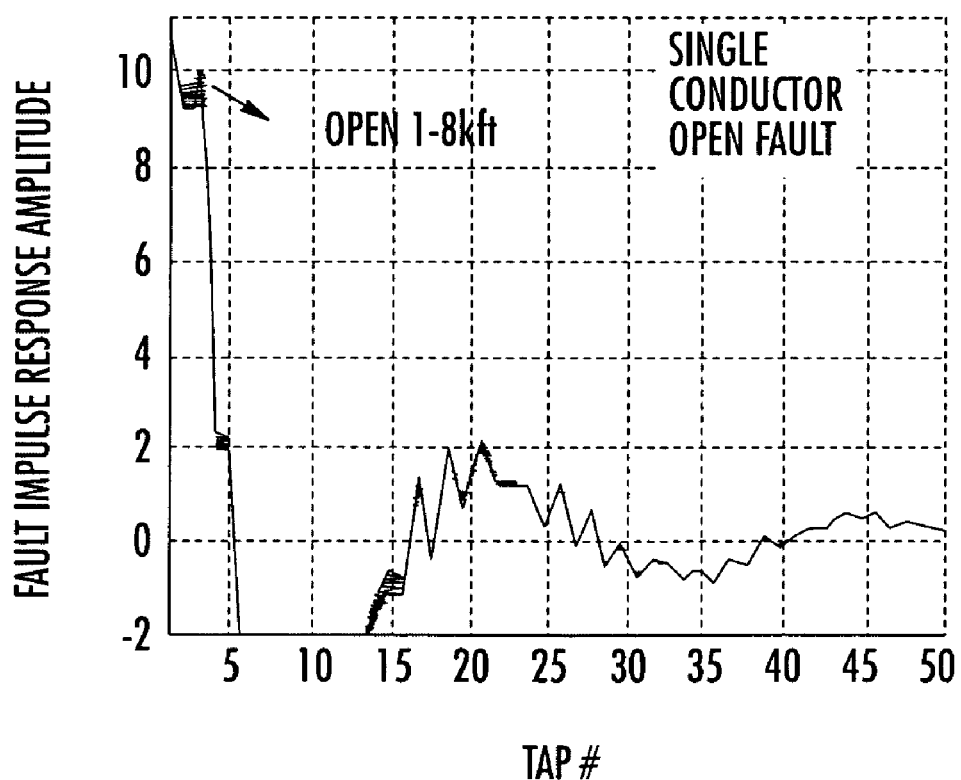
FIG. 19 is a response characteristic showing the "signature" of an open single conductor fault.

Before detailing the repeatered wireline-installed, digital echo-canceler-based fault location mechanism of the present invention, it should be observed that the invention resides primarily in prescribed modular arrangements of conventional communication circuits and associated digital signal processing components and attendant supervisory control circuitry therefor, that controls the operations of such circuits and components. In a practical implementation that facilitates their incorporation into existing printed circuit cards of telecommunication equipment, these modular arrangements may be readily implemented as field programmable gate array (FPGA)-implementation, application specific integrated circuit (ASIC) chip sets, programmable digital signal processors, or general purpose processors.

Consequently, the configuration of such arrangements of circuits and components and the manner in which they are interfaced with other telecommunication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

As described briefly above, the repeatered wireline fault location scheme of the present invention comprises an extension of the DSL line card installed mechanism disclosed in the above-referenced application, making use of the echo cancellation functionality of transceiver equipment within one or repeaters that are installed along a repeatered telecommunication wireline between a central office and a remote site (customer premises) to perform the fault location measurements, and an overhead channel of one or more intervening links to convey the results of the measurement operations to an upstream (central office) computer facility.

Figure 20:
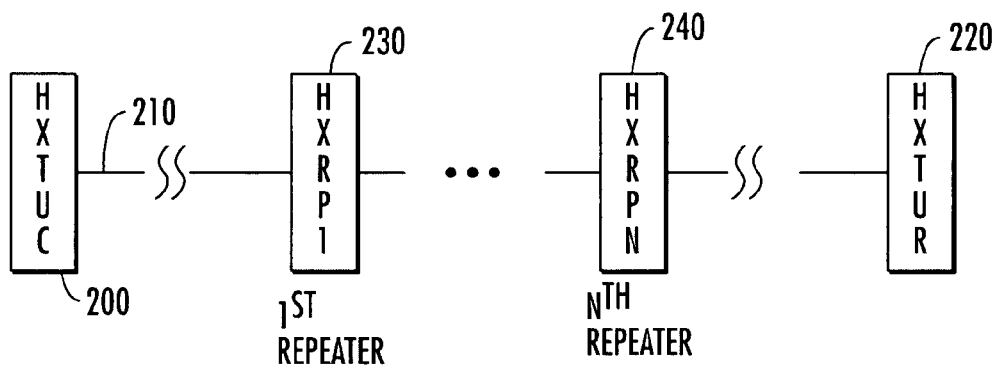
FIG. 20 is a block diagram of a repeatered wireline between a central office transceiver a remote site.

A block diagram of such a repeatered link is shown in FIG. 20 as comprising a central office transceiver (HxTUC) 200, which is coupled to a repeatered wireline link 210 over which communication service is provided to transceiver equipment 220 at a remote site (customer premises). Being a repeatered wireline, link 210 contains one or more repeaters (two repeaters 230 and 240 being shown in the non-limiting example of FIG. 20) between the central office transceiver 200 and remote site equipment 220. In accordance with the present invention, each repeater's transceiver is provisioned in the same manner as the DSL line card in the central office site, as described with reference to FIGS. 1–19, so that each repeater is capable of performing the above-described echo-cancellation based fault testing on that segment of wireline to which the repeater is connected (either to another repeater or to the remote site in the case of the last repeater). In addition, communications between a fault diagnostic repeater and the central office are conducted over an overhead channel, such as an embedded FDL overhead channel.

Figure 21:
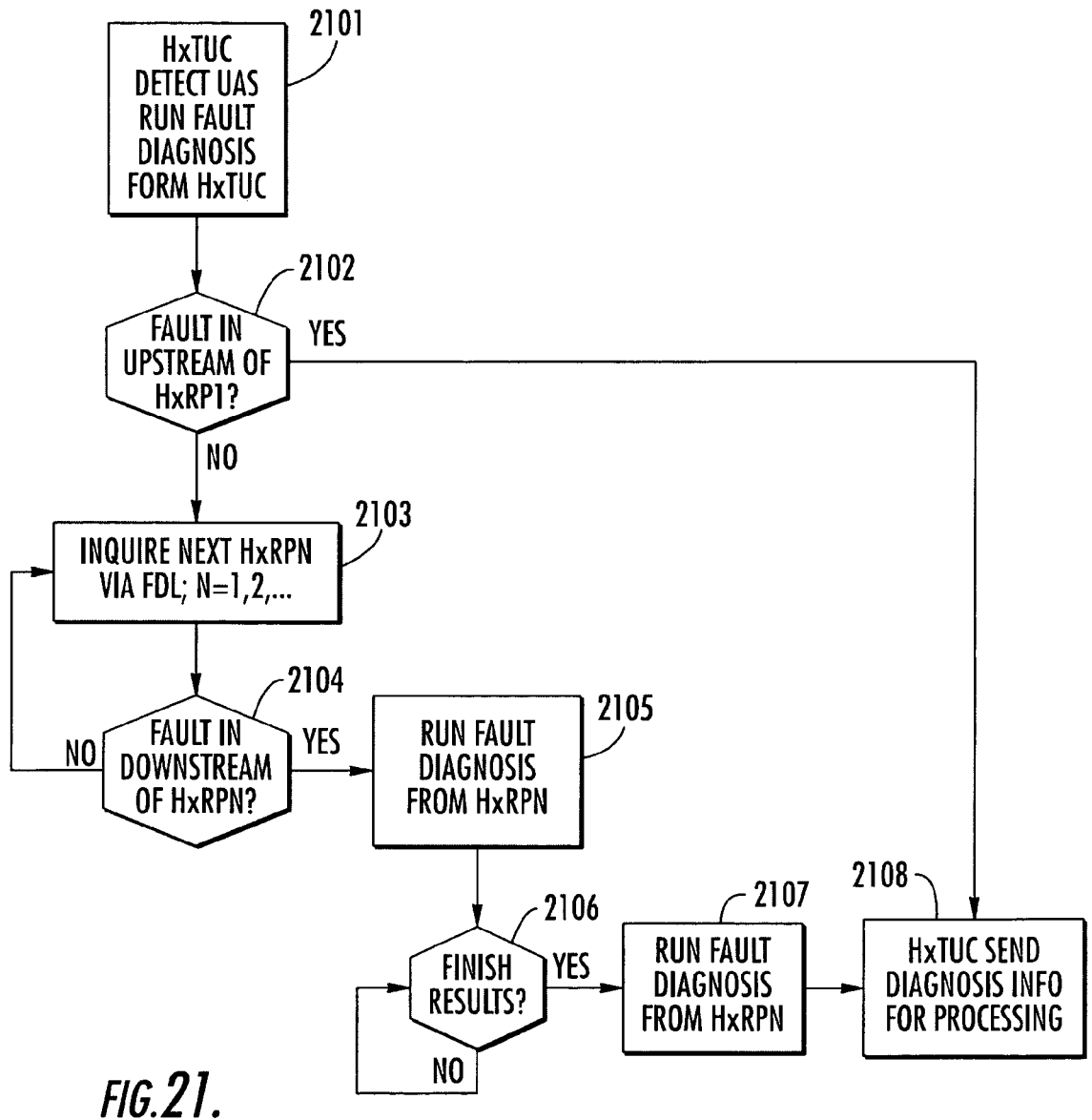
FIG. 21 is a flow chart showing the steps of the methodology of the present invention.

The methodology of the present invention may be readily understood by reference to the flow chart of FIG. 21. The routine begins at step 2101, wherein a fault is detected at the central office. This typically takes place when the central office transceiver (HxTUC) 200 detects a large number of UAS (unavailable seconds), indicating the occurrence of a fault somewhere down the repeatered link. In response to a fault being initially detected in step 2101, then in step 2102, the central office line card initially determines the fault resides in that segment of the wireline between the central office transceiver 200 and the first repeater 230. If the fault resides in this first, relatively upstream segment of the wireline, the fault diagnostic routine described above is executed and results reported to the supervisory processing computer (either locally or remotely as described above). For purposes of the present example, it will be assumed that the fault lies downstream of the first (upstream-most) repeater 230, such as between repeaters 230 and 240.

With no fault being detected in the segment of the wireline between the central office and the first repeater 230, an overhead message is conveyed to the first repeater in step 2103 to determine whether a fault condition exists on the downstream segment of wireline to which repeater 230 is connected. If no fault is detected (the answer to query step 2104 is NO), the message is propagated down the wireline, one intervening unit (repeater) at a time, and the fault query is repeated until a fault is detected (the answer to step 2104 is YES).

When a queried repeater identifies a fault on its associated wireline segment (the answer to query step 2014 is YES), then in step 2105, that transceiver proceeds to conduct the echo cancellation-based fault diagnostic routine described above. Once the fault diagnostic routine has been completed (the answer to step 2106 is YES), the results of the fault diagnostic operation are then forwarded back up the wireline via the messaging overhead channel (e.g., FDL channel) to the central office HxTUC 200 in step 2107. The reported results are then processed in step 2108 (either locally via a backplane-resident processor or by way of remote computer site, as described above).

As will be appreciated from the foregoing description, the echo canceler-based fault location mechanism described in the above-referenced applications may be employed extended to a repeatered wireline environment by making use of the functionality of transceiver equipment within one or repeaters installed along the wireline to perform the fault location measurements, and transmitting control and measurement data with respect to such measurements over an overhead channel between each repeater and the upstream (central office) computer facility.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. A method of determining the location of a fault along a repeatered wireline serving digital subscriber equipment at a location remote with respect to a central office facility, said method comprising the steps of:
    (a) applying an electrical stimulus to an electrically conductive wireline pair from a repeater installed in said wireline pair;
    (b) at said repeater, measuring a response of said electrically conductive wireline pair to said electrical stimulus applied in step (a), and generating an output from which the distance from said repeater to said fault is to be determined; and
    (c) processing said output generated in step (b) to determine where in said electrically conductive wireline pair said fault is located.

2. The method according to claim 1, wherein step (b) comprises transporting a message containing information representative of said output over an overhead channel from said repeater to said central office facility.

3. The method according to claim 2, wherein step (c) comprises processing said information to derive a measure of distance from said repeater to said fault.

4. The method according to claim 2, wherein step (c) comprises processing information contained in said message at a said central office facility to determine in the location of said fault.

5. The method according to claim 2, wherein step (c) comprises processing information contained in said message at a location separate from said central office facility to determine the location of said fault.

6. The method according to claim 1, wherein step (b) comprises establishing attributes of a digital echo canceler in said repeater, and step (c) comprises analyzing attributes of said digital echo canceler to derive a measure of the location of said fault.

7. The method according to claim 1, wherein said fault comprises an open circuit.

8. The method according to claim 1, wherein said fault comprises a short circuit.

9. The method according to claim 1, wherein step (a) comprises receiving a digital data signal, generating said electrical stimulus representative of said digital data signal, and applying said electrical stimulus to said electrically conductive wireline pair from said repeater installed in said electrically conductive wireline pair.

10. A method of determining the location of a fault along a repeatered wireline serving digital subscriber equipment at a location remote with respect to a central office facility, said method comprising the steps of:
    (a) applying an electrical stimulus to a wireline segment from a repeater installed in said wireline;
    (b) at said repeater, measuring a response of said wireline segment to said electrical stimulus applied in step (a), and generating an output from which the distance from said repeater to said fault is to be determined; and
    (c) processing said output generated in step (b) to determine where in said wireline segment said fault is located wherein step (a) comprises applying a wideband signal to said wireline segment from said repeater, and step (b) comprises generating coefficients of an echo cancellation operator in accordance with the measured reflection response of said wireline segment to said wideband signal, and generating an output representative of said coefficients of said echo cancellation operator.

11. An arrangement for determining the location of a fault along a repeatered electrically conductive wireline pair serving digital subscriber equipment at a location remote with respect to a central office facility, comprising:
    an electrical stimulus generator within a repeater; and
    a measurement unit installed in said repeater, which is operative to measure a response to said electrical stimulus of an electrically conductive wireline pair to which said repeater is connected, and to transmit a message over an overhead to said central office representative of said response.

12. The arrangement according to 11, further including a processing unit that is operative to process information contained in said message transmitted over said overhead from said repeater to determine where in said electrically conductive wireline pair said fault is located.

13. The arrangement according to claim 12, wherein said processing unit is operative to process said information to derive a measure of distance from said repeater to said fault.

14. The arrangement according to claim 12, wherein said processor is operative to process information contained in said message at a said central office facility to determine in the location of said fault.

15. The arrangement according to claim 12, wherein said processor is operative to process information contained in said message at a location separate from said central office facility to determine the location of said fault.

16. The arrangement according to claim 12, wherein said measurement unit is operative to establish attributes of a digital echo canceler in said repeater, and said processing unit is operative to analyze attributes of said digital echo canceler to derive a measure of the location of said fault.

17. The arrangement according to claim 11, wherein said fault comprises an open circuit.

18. The arrangement according to claim 11 wherein said fault comprises a short circuit.

19. The arrangement according to claim 11, wherein said electrical stimulus generator is operative to receive a digital data signal, generate an electrical stimulus representative of said digital data signal, and apply said electrical stimulus to said electrically conductive wireline pair from said repeater.

20. An arrangement for determining the location of a fault along a repeatered wireline serving digital subscriber equipment at a location remote with respect to a central office facility, comprising:
- a measurement unit installed in said repeater, which is operative to measure a response to said electrical stimulus of a wireline segment to which said repeater is connected, and to transmit a message over an overhead to said central office representative of said response; and
- a processing unit that is operative to process information contained in said message transmitted over said overhead from said repeater to determine where in said wireline segment said fault is located, and wherein said an electrical stimulus generator is operative to apply a wideband signal to said wireline segment from said repeater, and said measurement unit is operative to generate coefficients of an echo cancellation operator in accordance with the measured reflection response of said wireline segment to said wideband signal, and to generate an output representative of said coefficients of said echo cancellation operator.

21. A method comprising;
(a) conducting electrical measurements upon an electrically conductive wireline pair from a repeater unit installed in said electrically conductive wireline pair;
(b) reporting results of said electrical measurements conducted in step (a) over an orderwire to a processing unit; and
(c) processing said results of said electrical measurements reported in step (b) at said processing unit to determine the location of said fault.

22. The method according to claim 21, wherein step (a) comprises stimulating said electrically conductive wireline pair to establish attributes of a digital echo canceler, step (b) comprises transmitting information representative of said attributes of said digital echo canceller to said processing unit, and step (c) comprises analyzing said attributes of said digital echo canceler to derive a measure of distance from said DSL line card to said fault.

23. The method according to claim 21, wherein step (a) comprises conducting said electrical measurements upon said electrically conductive wireline pair by receiving a digital data signal, generating an electrical stimulus representative of said digital data signal, and applying said electric stimulus to said electrically conductive wireline pair from said repeater unit.

* * * * *